Feb. 12, 1924. Re. 15,762

J. WICKS

MEASURED SERVICE TELEPHONE SYSTEM

Original Filed Feb. 12, 1919 2 Sheets-Sheet 1

Inventor
John Wicks
Chas. M. Candy Atty.

Feb. 12, 1924. Re. 15,762

J. WICKS

MEASURED SERVICE TELEPHONE SYSTEM

Original Filed Feb. 12, 1919 2 Sheets-Sheet 2

Inventor
John Wicks

Chas. M. Candy Atty.

BEST AVAILABLE COPY

Reissued Feb. 12, 1924. Re. 15,762

UNITED STATES PATENT OFFICE.

JOHN WICKS, OF CHICAGO, ILLINOIS, ASSIGNOR TO AUTOMATIC ELECTRIC COMPANY, OF CHICAGO, ILLINOIS, A CORPORATION OF ILLINOIS.

MEASURED-SERVICE TELEPHONE SYSTEM.

Original No. 1,379,068, dated May 24, 1921, Serial No. 276,463, filed February 12, 1919. Application for reissue filed January 2, 1923. Serial No. 610,340.

*To all whom it may concern:*

Be it known that I, JOHN WICKS, a citizen of the United States of America, and a resident of Chicago, Cook County, and State of Illinois, have invented certain new and useful Improvements in Measured-Service Telephone Systems, of which the following is a specification.

My invention relates in general to an automatic telephone system and more specifically to an improved means for controlling a measured service device or meter in a system of the automatic type.

Among the objects of my invention are to simplify the devices necessary for measured service systems and to provide an improved system in which the meter will not be falsely operated when calling special calls such as ring back numbers in which ringing current is projected back over the calling line.

The above object is accomplished by delaying the operation of the meter in such a manner that the polarized relay used for controlling the same must be energized by a permanent reversal of current before the meter will operate and therefore any fluttering or false operating of said relay by ringing current will not operate the meter.

Figure 1:
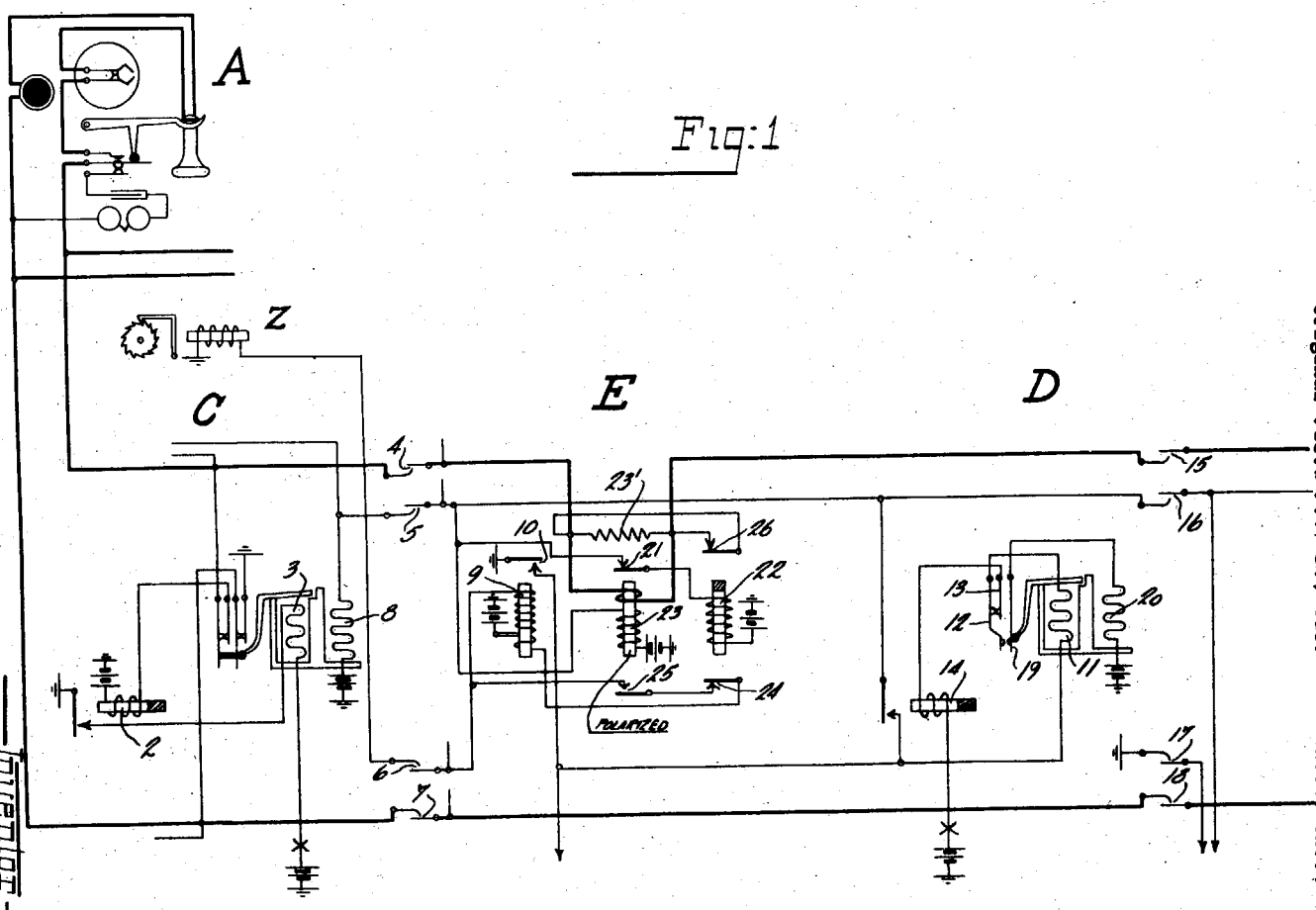
Figure 2:
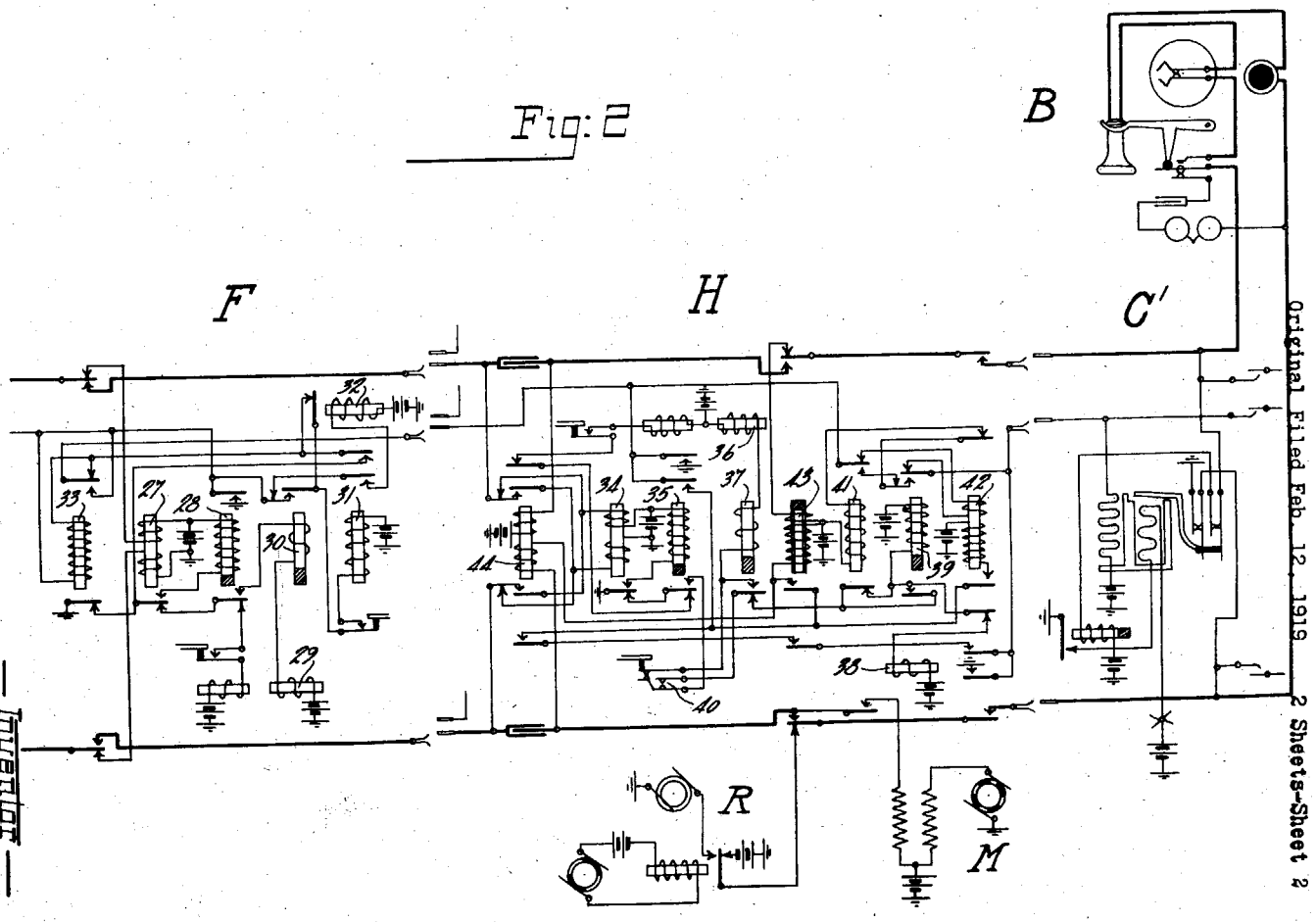

These features of my invention will be explained more in detail by referring to the accompanying drawings in which Figure 1 shows an established connection from a calling subscriber through a primary and secondary line switch and Fig. 2 shows the continuation of said connection through a selector and connector switch to a called subscriber's line.

In this case the meter controlling relay which is usually associated with each line or line switch is made common to a plurality of lines in a manner similar to that shown in an aplication of Arthur J. Ray, Ser. No. 4573 of 1915 filed January 26, 1915, renewed August 26, 1918, Serial No. 251,541, Patent No. 1,304,369, granted May 20, 1919.

However, in the said prior application it will be seen that should ringing current or any other alternating current be sent back to the calling line, the meter would be operated.

I will now describe the operation when a subscriber at A calls a subscriber such as B. I will explain the operation of the various switches only generally, such switches being well known in the art.

When a subscriber A removes his receiver to initiate a call a circuit is closed for the line relay 2 of the primary line switch C in series with the calling line. Relay 2 closes the circuit of the pull in winding 3 to attract the plunger and close the springs 4, 5, 6 and 7 in contact to extend the line circuit to a second line switch D. The relay 2 is also disconnected from the line circuit but maintains the circuit of winding 3 closed until ground is supplied to the holding winding 8 over the release trunk from the switch ahead. As soon as springs 6 close contact, a circuit is closed for the meter Z through the upper winding of a special relay 9 which is one of the common group of meter controlling relays E associated with the trunk to a secondary line switch. The upper winding of relay 9 is of such high resistance that the meter Z does not energize over this circuit. Relay 9 however energizes to close a circuit at springs 10 for the pull in winding 11 of the secondary line switch D through springs 12 and 13 and relay 14 to battery. Relay 14 energizes to connect ground to the release trunk to hold winding 8 of line switch C energized and winding 11 operates to plunge the line switch and close in contact the pairs of springs 15, 16, 17 and 18 to extend the line circuit to a first selector F (Fig. 2). Also winding 11 operates to open the springs 12 and 13 and connect the winding 11 through springs 19 and 12 in series with the high resistance holding winding 20 to maintain the connection. Relay 14 being slow acting holds ground from springs 10 to keep the line switch C energized. This ground on the release trunk also passes through the springs 21 and slow relay 22 of the group of relays E and through the lower winding of the electropolarized relay 23. Relay 22 energizes over this circuit but relay 23 is so adjusted that it will not energize with either its upper or lower winding alone nor when both windings are energized by current flowing in opposite directions but only when both windings assist each other. The lower winding alone will hold the relay in energized position when its armatures have once been attracted. Relay 22 upon energizing, opens the springs 24 in the circuit of the lower winding of relay 9. Relay 22 also opens a pair of springs 26 which remove a short circuit from the upper winding of relay 23 and allows current to flow therethough. A non-inductive resistance 23′ is shunted about the upper winding of relay 23 to allow a free path for voice currents. When the springs 15 and 18 of the line switch D close, the line circuit is extended to a selector switch F (Fig. 2) and a circuit is closed for the line relay 27 thereof in series with the extended line circuit and with the upper winding of relay 23 in the set of relays E. Relay 23 does not energize at this time as current now flows in opposite directions in its two windings.

The relay 27 is now controlled by the impulse sender of the calling line to operate the selector F to select an idle trunk to a connector H. Relay 27 when first energized closes a circuit for relay 28 to prepare a circuit for the vertical magnet 29 and supply ground to the release trunk to hold the switches C and D from releasing and to hold the circuits of the trunk relays 22 and 23 closed. When relay 27 responds to impulses it closes a circuit intermittently for the vertical magnet 29 and the slow relay 30 in series to raise the wipers to a desired row or level of contacts. Relay 30 closes the circuit of relay 31 which in turn prepares a circuit for the rotary magnet 32 which is closed after the first series of impulses when relay 30 falls back. If the trunk line seized by the first energization of the rotary magnet is busy, a ground is present on the private contact thereof which again energizes relay 31 after its circuit is closed by the deenergization of the rotary magnet and therefore the circuit of the rotary magnet is closed and the wipers are stepped to the next set of contacts and so on. When an idle trunk is reached the ground is no longer present and relay 33 is energized over a circuit in series with the relay 31, which latter relay does not energize due to the high resistance of the relay 33. Relay 33 upon energizing, disconnects the various magnets and relays of the selector F from the talking circuit and extends said talking circuit through the wipers and the seized trunk to the line relay 34 of the connector H.

Relay 34 of the connector energizes and closes a circuit for slow relay 35 which grounds the release trunk back to the selector and line switches and prepares a circuit for the vertical magnet 36. When relay 34 responds to the next series of impulses the relay 34 controls the vertical magnet in series with slow relay 37 to step the wipers to a desired level of contacts in which are located the contacts to which the called line is connected. After this series of impulses, relay 37 falls back to prepare a circuit for the rotary magnet 38 and the slow relay 39 through the now closed off normal springs 40. When relay 34 operates for the next series of impulses, the rotary magnet 38 is operated to step the wipers to the contacts of the desired line and relay 39 energizes and remains energized for a short interval after the wipers reach the called line. If the called line is busy and a ground present on the test conductor thereof, a circuit will be closed through front contact of relay 39 for the busy relay 41 which will lock up and transmit a busy signal. If the called line is idle then relay 41 will not be energized and as soon as relay 39 falls back after the line relay 34 comes to rest energized, a circuit is closed for the lower winding of relay 42 in series with the cut off winding of the line switch C′. Relay 42 and the cut off winding energize in series. Relay 42 disconnects the rotary magnet to prevent further operation and cuts the called line through to the ringing circuit which leads from the back contact of relay 43 and which includes one winding of relay 43 and battery, so that when the called man responds to the signal he closes the circuit of relay 43 which cuts off the ringing circuit and cuts the called line to the windings of the back bridge or reversing relay 44. Relay 44 therefore energizes in series with the called line circuit and operates to reverse the connection of the line relay 34 with regard to the talking circuit and thus reversing the direction of the current flow in the calling line and through the upper winding of the relay 23 at E. Relay 23 will energize at this time to close the springs 25 which close one point in the circuit including the lower winding of relay 9 and the meter magnet Z which circuit is still open at springs 24 of relay 22. Relay 23 also opens the circuit of slow relay 22 at springs 21. Relay 22 will after a short interval, which will be long enough to be sure that the battery is permanently reversed in the circuit, deenergize and close the springs 24 and 26. Springs 24 now complete the circuit including the meter and the comparatively low resistance winding of relay 9 and therefore cause the meter Z to operate and register the call. The springs 26 operate to short circuit the upper winding of relay 23 to prevent any further changes in the line circuit from affecting the operation of said relay, which is held energized by its lower winding alone. Thus it will be seen that should relay 23 be energized only momentarily, either by ringing current from a ring back switch or from only a movement of the hook at the called station, without staying energized long enough for the relay 22 to deenergize, the meter will not be operated as the springs of the relay 22 directly control the meter operating circuit as well as the circuit which short circuits the line winding of the relay 23.

Thus it will be seen that my invention is especially adapted for party line systems in which it is desired to ring another party on the same line by sending alternating current back over the extended connection, or in a semiautomatic system in which the operation is brought in on the connection to signal the other one of a pair of lines or in fact in any system where a meter of this character is used and where there is any chance of the current in the line being reversed momentarily when it is not desired to operate the meter. Although I have shown my meter controlling system in a simple connection without a ring back switch or other details, it is thought that the manner in which the meter is here shown is sufficiently clear to show all its details and features of improvement.

Having fully described and ascertained the features and aspects of my invention, what I consider to be new and desire to have protected by Letters Patent will be pointed out in the appended claims.

What I claim as my invention is:

1. In a telephone system, a meter, a circuit therefor, a meter controlling relay, means for operating said meter controlling relay to close one point of said circuit, and auxiliary controlling means for delaying the operation of said meter by holding said circuit open at another point for a predetermined interval beginning when said circuit is closed at the first point.

2. In a telephone system, a meter, a circuit therefor, a meter controlling relay, means for operating said meter controlling relay to close said circuit at one point, and a slow-acting relay for delaying the complete closure of said circuit for a predetermined interval beginning when said first relay is operated.

3. In a telephone system, a calling line, a called line, means for establishing a talking circuit between said lines, means controlled by the subscriber on the called line for reversing the current in said talking circuit, a relay responsive to said reversal of current, a meter for the calling line having a circuit controlled by said relay, and additional means for delaying the closure of said circuit after the relay is operated.

4. In a telephone system, a calling line, a called line, means for establishing a talking circuit between said lines, means controlled by the subscriber on the called line for reversing the current in said talking circuit either momentarily or permanently, a relay responsive to said reversal of current, a meter for the calling line controlled by said relay, and additional means for preventing the operation of the meter when the current is reversed momentarily.

5. In a telephone system, a calling line, a called line, means for establishing a talking circuit between said lines, means controlled by the subscriber on the called line for reversing the current in said talking circuit either intermittently or permanently, a relay responsive to said reversal of current, a meter for the calling line controlled by said relay, and additional means for preventing the operation of the meter when the current is reversed intermittently.

6. In a telephone system, a calling and a called line together with means for establishing a talking circuit between them and having means for reversing the current flow in said talking circuit momentarily, a meter for one of said lines, a relay for controlling said meter responsive to each reversal of current, and additional means for preventing the operation of the meter when the current is reversed.

7. In a telephone system, a calling and a called line together with means for establishing a talking circuit between them and having means for reversing the current flow in said talking circuit momentarily, a meter for one of said lines, a relay for controlling said meter responsive to each reversal of current, and delaying means controlled by said relay for preventing the operation of the meter.

8. In a telephone system, calling lines, meters for each line, a common relay for controlling any of said meters, said relay adapted to be inserted in a talking circuit from one of said calling lines to another line and responsive to reversals of current in said talking circuit to prepare the circuit of the meter, and additional means for delaying the operation of the associated meter after its circuit has been prepared by said relay.

9. In a telephone system, lines, a register for each line, a trunk line common to said lines, means for extending a talking circuit from any calling line over the trunk line, a relay associated with said trunk, a circuit for the calling line register controlled by said relay, another relay controlled by said first relay having means for controlling the first relay and the register circuit, said other relay always controlling the register circuit a certain interval of time after said circuit is controlled by the operation of the first relay.

10. In a telephone system, a plurality of lines, a service recorder for each line, another line, means for connecting any of said lines with said other line, a circuit for the recorder associated with the connected line having two points of control, means associated with said other line and controlled thereover for closing both of said points, and automatic means for delaying the closure of one of said points for a predetermined interval beginning when the first point is closed to delay the operation of said recorder.

11. In a telephone system, a meter, a circuit for said meter, a deenergized relay holding said circuit open at one point, an energized relay holding said circuit open at another point, means for energizing said first relay to close said circuit at the first point, and means controlled by the energization of said first relay for opening the circuit of said second relay to deenergize the same and close said circuit at the second point.

12. In a telephone system, a meter, a circuit for said meter normally open at one point and closed at another point, means for opening the circuit at the second point, means for closing the circuit at the first point, and means for then closing the cirvuit again at the second point to operate the meter.

13. In a telephone system, a meter, a circuit for said meter normally open at one point and closed at another point, a relay for opening said circuit at the second point, a second relay for closing the circuit at the first point, and circuit arrangements whereby said second relay controls said first relay to cause said first relay to again close the circuit at the second point to operate said meter.

14. In a telephone system, a meter, a circuit for said meter normally open at one point and closed at another point, a relay for opening said circuit at the second point, a second relay for closing the circuit at the first point, a circuit for the first relay opened by the second relay, and means for delaying the deenergization of said first relay to prevent the immediate completion of the meter circuit.

15. In a telephone system, means for connecting a calling and called line, a meter for the calling line, a circuit for said meter normally open at one point and closed at another point, a relay for opening the circuit at the second point before the connection is completed, a relay for closing the circuit at the first point when the called party answers, and a circuit for the first relay controlled by the second relay to effect the deenergization of the first relay, whereby the meter circuit is finally completed to register the call.

16. In a telephone system, means for connecting a calling and called line, a meter for the calling line, a relay controlled by the called party for closing a normally open point in the circuit of said meter, said circuit remaining open temporarily at another point, a slow-acting relay for closing the meter circuit at the second point, and a circuit for the slow relay controlled by said first relay, whereby the final closure of the meter circuit is delayed for a predetermined time after the response of the called subscriber.

17. In a telephone system, means including a trunk line for connecting a calling and called line, a meter for the calling line, quick and slow relays individual to said trunk line for operating said meter upon the response of the called subscriber, contacts on the quick relay for preparing the circuit of the meter by closing it at one point, and contacts on the slow relay for completing the circuit of the meter at another point a predetermined length of time after the operation of the quick relay.

18. In a telephone system, a meter, a circuit therefor, a meter controlling relay, means for operating said meter controlling relay to close one point in said circuit, and auxiliary controlling means for operating said meter by completely closing said circuit at another point a predetermined time after it is closed at the first point.

19. In a telephone system, a meter, a circuit therefor, a meter controlling relay, means for operating said meter controlling relay to close said circuit at one point, and a slow acting relay for closing said circuit at a second point a predetermined time after the said first relay is operated.

20. In a telephone system, a plurality of lines, a service recorder for each line, another line, means for connecting any of said lines with said other line, a circuit for the recorder associated with the connected line having two points of control, means associated with said other line and controlled thereover for closing said circuit at one of said points, and automatic means initially controlled over said other line for closing said circuit at the other of said points a predetermined time after the circuit is closed at the first point.

Signed at Chicago, Illinois, Cook County, this 30th day of December, 1922.

JOHN WICKS.